(12) United States Patent
Chao Cheng (10) Patent No.: US 8,026,816 B2
(45) Date of Patent: Sep. 27, 2011

(54) RFID CARGO/STORAGE CONTAINER TAMPER SEAL

(76) Inventor: Jin-Hao Chao Cheng, Taoyuan (TW)

( * ) Notice: Subject to any disclaimer, the term of this patent is extended or adjusted under 35 U.S.C. 154(b) by 480 days.

(21) Appl. No.: 12/315,695

(22) Filed: Dec. 5, 2008

(65) Prior Publication Data

US 2009/0212950 A1    Aug. 27, 2009

(30) Foreign Application Priority Data

Feb. 26, 2008    (TW) ................. 97106562 A (51) Int. Cl.
G08B 13/14 (2006.01)
E05B 39/02 (2006.01)
(52) U.S. Cl. ............. 340/572.1; 340/539.31; 340/568.1; 292/327
(58) Field of Classification Search ........................ None
See application file for complete search history.

(56) References Cited

U.S. PATENT DOCUMENTS

| | | | | |
|---|---|---|---|---|
| 6,265,973 | B1 * | 7/2001 | Brammall et al. | 340/568.1 |
| 2003/0011474 | A1 * | 1/2003 | Ng | 340/568.1 |
| 2006/0170560 | A1 * | 8/2006 | Auerbach et al. | 340/572.9 |
| 2009/0091144 | A1 * | 4/2009 | Debrody et al. | 292/327 |

* cited by examiner

Primary Examiner — George Bugg
Assistant Examiner — Renee Dorsey
(74) Attorney, Agent, or Firm — Morland C. Fischer (57) ABSTRACT

An RFID cargo/storage container tamper seal consisting of a main insulating body, a locking rod and a circuit module is disclosed. The main insulating body has a helix-shaped antenna and a ring-shaped metal ring, wherein the inner surface of the metal ring has a C-shaped ring inlaid therein, and the antenna has an antenna probe extending and protruding from the metal ring. A first portion of the locking rod is cone-shaped and encapsulated by an insulating material, and a second portion thereof exposed from the insulating material has a ring-shaped groove disposed around its peripheral surfaces. The circuit module has an RFID chip embedded therein and is packaged inside the rod portion, thereby allowing an RFID reader to read electromagnetic waves/signals containing identification codes transmitted from the RFID chip of the RFID tamper seal via the antenna.

15 Claims, 10 Drawing Sheets

RFID CARGO/STORAGE CONTAINER TAMPER SEAL

BACKGROUND OF THE INVENTION

1. Field of the Invention

The present invention generally relates to an RFID cargo/storage container tamper seal, and, more particularly, to a passive UHF omnidirectional power-free cargo/storage container tamper seal suitable for sea-going cargo containers comprised of a three-dimensional helix-shaped antenna.

2. Description of the Related Art

Container tamper seals commonly used in the current transportion or storage industry include mechanical tamper seals and active RFID tamper seals. By way of comparison, conventional mechanical tamper seals have the advantage of low-cost but are also known to have drawbacks in terms of scanning and management due to their inability to be read in a fully automatic way during customs clearance. Conversely, active RFID tamper seals are more costly but are capable of providing automation of container transportation; however, such tamper seals cannot realize long-distance transmission and also typically have a directional issue to overcome.

RFID tamper seals have been tested and employed in various ports under the American Customs-Trade Partnership Against Terrorism (C-TPAT) initiative, and have been proven to be able to improve on and upgrade the automation of customs clearance over existing mechanical tamper seals. Moreover, RFID technology has become increasingly popular because it enables automation of container transportation, replacing manual operation to thus increase efficiency.

Figure 1:
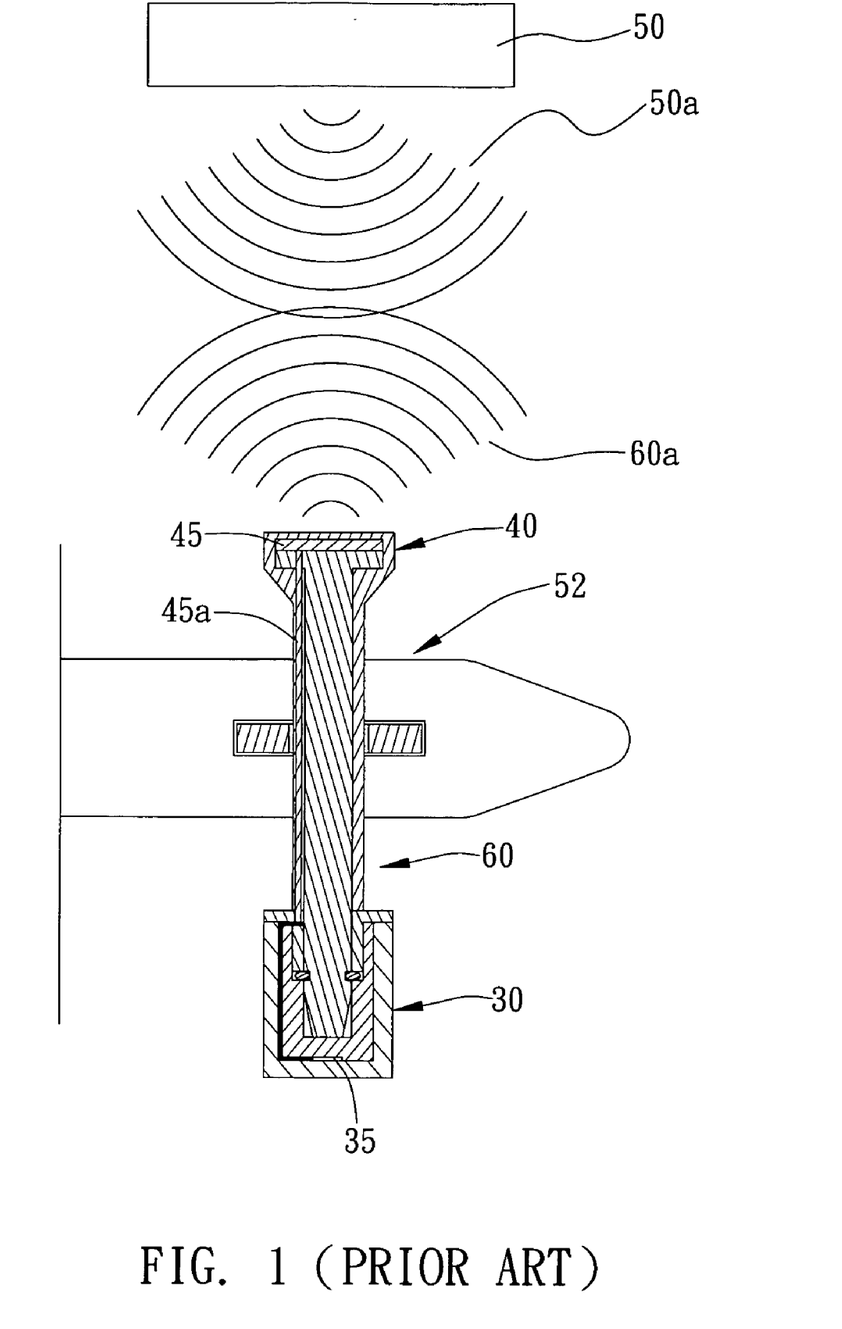
FIG. 1 is an assembled cross-sectional view showing a conventional RFID tamper seal in use.

In practical application, an RFID tamper seal (Smart-Seal) is disposed at a place where the container is opened, that is, usually on the doorbolt lock latch. Typically, two tamper seals are disposed on a container assembly consisting of two 20-foot containers, one on the front-facing container and one on the rear-facing container, or a single tamper seal is provided at the rear of a full-sized 40-foot container. At a scanning distance of 3.5 meters, real-time identification can be achieved when the container vehicle is stopped or moving under the speed of 30 km/hr while passing through an RFID reader provided at Customs. In the prior art, U.S. Pat. No. 2007/0194025A1 discloses the foregoing smart-seal as shown in FIG. 1, in which an electronic tamper seal 60 comprises an insertion bolt 40 and a main body 30, the insertion bolt 40 comprising an antenna 45 and the main body 30 having an RFID chip 35, the main body 30 being coupled to the insertion bolt 40 on the door bolt latch 52. Upon customs clearance, the RFID reader 50 at Customs senses the electronic tamper seal 60 and automatically provides the electronic tamper seal 60 with an energetic electromagnetic wave 50a to enable the RFID chip 35 equipped therein to transmit an identification electromagnetic wave 60a comprising an ID code back to the RFID reader 50.

Figure 2:
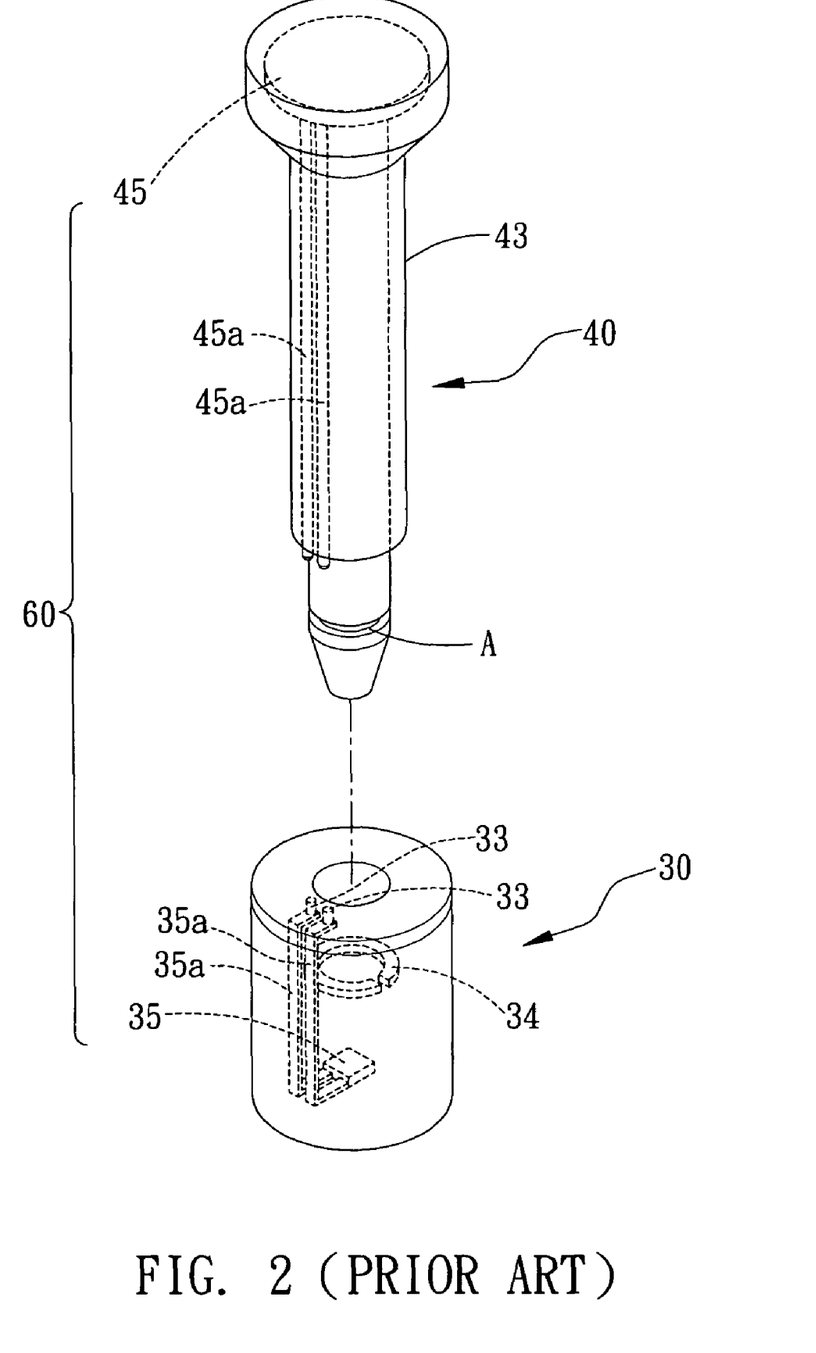
FIG. 2 is a perspective exploded view showing a conventional RFID tamper seal.

FIG. 2 is a perspective exploded diagram illustrating the foregoing RFID tamper seal, in which the tamper seal 60 comprises a main body 30 having a cavity and an insertion bolt 40 in a cylindrical shape. The main body 30 comprises a pair of conductive pins 35a, an identification chip 35 electrically connected to the conductive pins 35a, a pair of connecting pins 33 electrically connected to the conductive pins 35a, and a C-shaped ring 34 configured in the cavity of the main body 30. The insertion bolt 40 comprises a pair of antenna legs 45a electrically connected to an antenna 45 disposed on the top of the insertion bolt 40. The insertion bolt 40 further comprises a ring-shaped groove A adapted to combine with the C-shaped ring 34 when the insertion bolt 40 is received in the main body 30, and further allow the connecting pins 33 disposed on the conductive pins 35a of the main body 30 to be electrically connected to the antenna legs 45a disposed on the insertion bolt 40, thereby allowing identification signals from the RFID chip 35 to be transmitted therefrom via the conductive pins 35a and antenna legs 45a.

Figure 3:
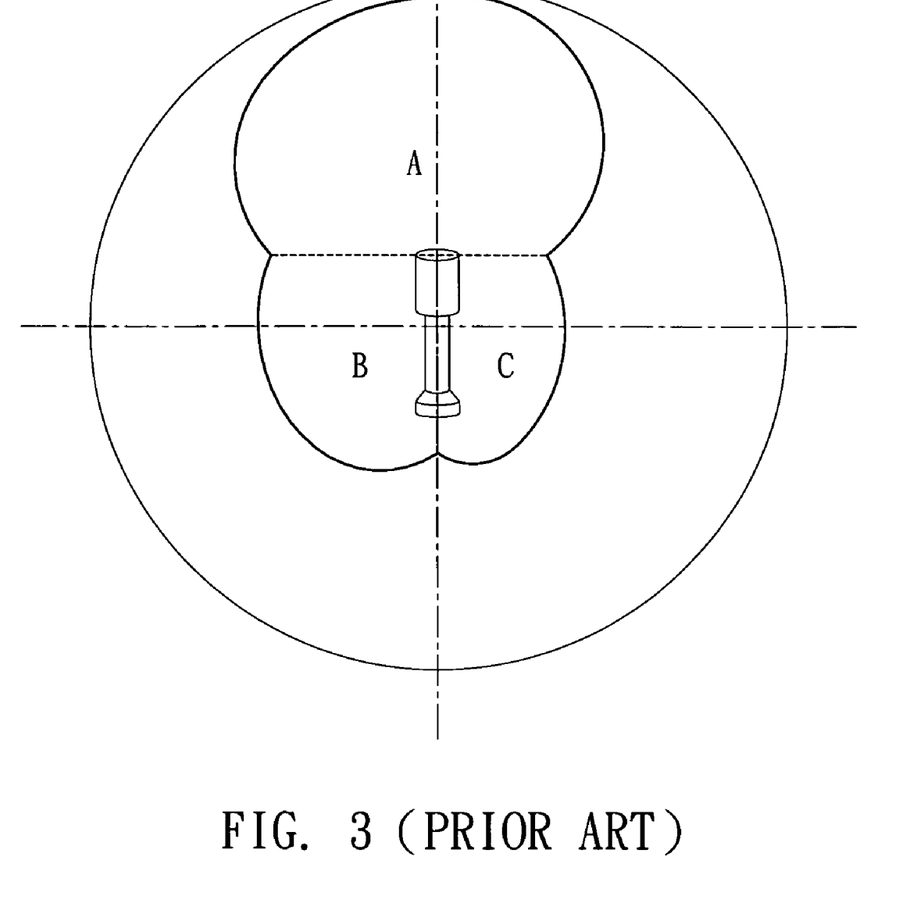
FIG. 3 is a perspective view showing the field pattern of the conventional RFID tamper seal.

From the above disclosure and figures, it is noted that the electromagnetic wave transmitted by the antenna 45 has a directional limitation (as shown in FIG. 1) due to the planar configuration of the antenna 45 of the electronic tamper seal 60. Further, the radiated field pattern thereof, as shown in FIG. 3., is uneven in zones A, B and C due to configuration limitations of the antenna legs 45a, the conductive pins 35a, and the identification chip 35. As a consequence, it is necessary to install and fasten the RFID tamper seal 60 on the door bolt latch with the orientation depicted in FIG. 1 with the antenna directed at the reader to allow the RFID reader 50 to better sense the antenna 45 so that the reader 50 can receive the electromagnetic waves 60a conveying the identification signal transmitted from the RFID tamper seal 60 for access and customs clearance. Further, as shown in FIG. 2, application of the tamper seal also requires precise alignment in order for the electronic tamper seal to function properly when the antenna legs 45a disposed on the insertion bolt 40 are engaged with the conductive pins 35a of the main body 30.

In summary, while the foregoing RFID tamper seal improves on and has advantages over mechanical tamper seals of the prior art, such as convenience in usage and quick detection of any tampering, it also has the aforementioned structural and usage limitations involving inconvenience in application and usage, particularly with respect to the directional issue.

SUMMARY OF THE INVENTION

In view of the drawbacks associated with the prior art, it is an objective of the present invention to provide an RFID tamper seal applicable to Customs safety inspection systems equipped with RFID readers that is capable of realizing omnidirectional long-distance transmission.

Another objective of the present invention is to provide an RFID tamper seal applicable to Customs safety inspection systems equipped with RFID readers that is capable of realizing automatization of Customs clearance and high efficiency of the inspection system.

A further objective of the present invention is to provide an RFID tamper seal applicable to Customs safety inspection systems equipped with RFID readers that can be easily applied to doorbolt latches of a container.

Still another objective of the present invention is to provide an RFID tamper seal applicable to Customs safety inspection systems equipped with RFID readers that is capable of reducing operational costs in container management.

To achieve the above and other objectives, the invention provides a novel RFID tamper seal applicable to Customs safety inspection systems equipped with RFID readers. The RFID tamper seal consists of a main insulating body; a helix-shaped antenna installed in the main insulating body and comprising a probe; a metal ring accommodated in the insulating main body and having a C-shaped ring inlaid around its inner surface; a locking rod comprised of a hollow metal pillar, wherein a first portion of the locking rod is in a cone shape and is encapsulated by an insulating material and a second portion thereof not covered by the insulating material has a ring-shaped groove disposed around its peripheral surfaces; and a circuit module comprised of an RFID chip, an impedance module, a conductive elastic piece and a probe sheath, the circuit module being packaged in the hollow portion of the locking rod, one end of the RFID chip being connected with the conductive elastic piece while the other end thereof is electrically connected to an end of the impedance module, and the other end of the impedance module being electrically connected to the probe sheath via the conductive material plated on the circuit module.

The RFID tamper seal proposed by the present invention is characterized by employing the Ultra High Frequency (UHF) passive transmission technique to achieve radio frequency signal transmission and automatic identification without requiring batteries to supply power. Further, the present invention has a helix-shaped antenna capable of omnidirectional transmission of frequency signals, which is applicable to and more compatible with various types of readers having differing orientations without concern about the orientation of the container lock latch or the antenna. Also, the cap member (i.e. the insulating body and the rod portion) for connecting the RFID tamper seal is provided with a C-shaped ring and a ring-shaped groove and the antenna has only a plug-in orientation for connecting with the probe sheath, thereby providing easy installation compared to prior techniques.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

The following illustrative embodiments are provided to illustrate the disclosure of the present invention, these and other advantages and effects can be readily understood by persons skilled in the art after reading the disclosure of this specification. The present invention can also be performed or applied by other differing embodiments. The details of the specification may be changed in terms of various points and applications, and numerous modifications and variations can be devised without departing from the spirit of the present invention.

Figure 4:
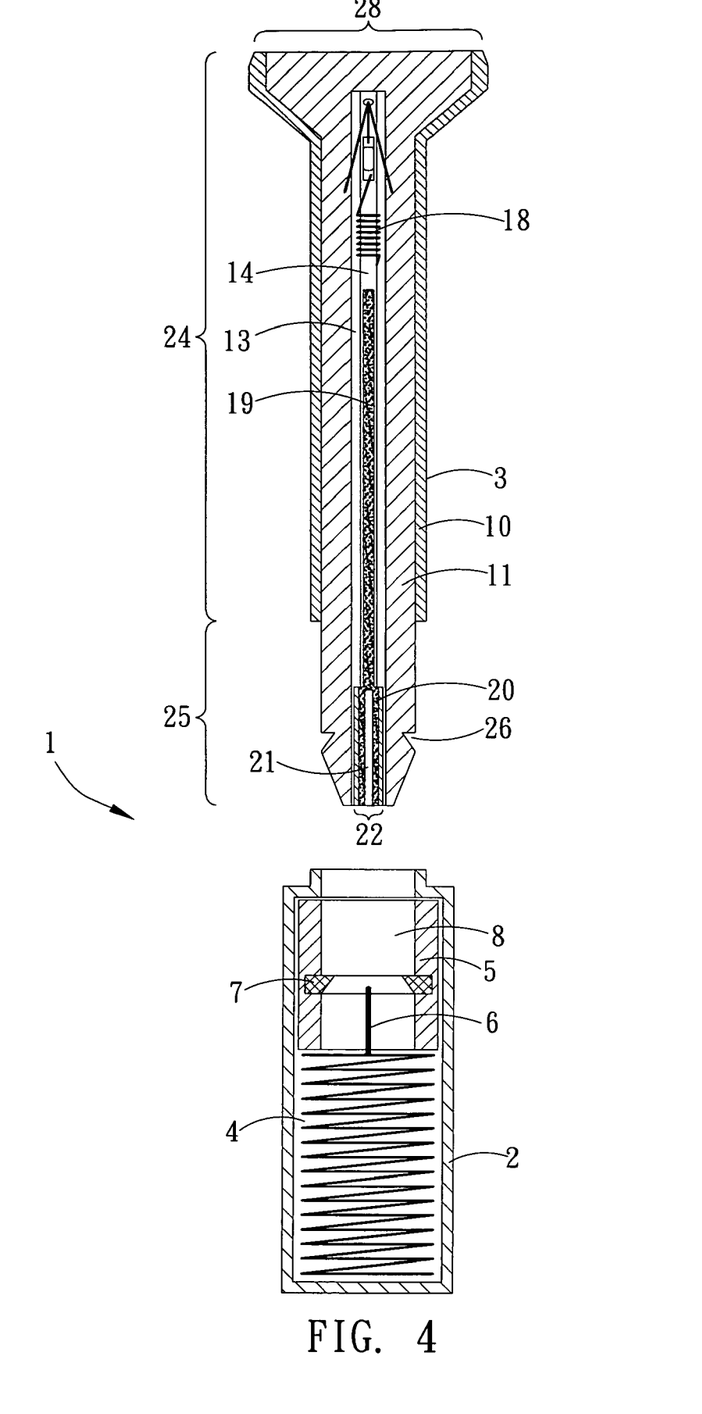
FIG. 4 is a cross-sectional view showing the first embodiment of the RFID tamper seal in accordance with the present invention.

FIG. 4 depicts the first embodiment of the RFID tamper seal of the present invention, which is applicable to Customs safety inspection/automated clearance systems equipped with RFID readers, the RFID tamper seal being adapted to install on the doorbolt latches of a container, so that when a container vehicle passes an inspection system at Customs, the RFID tamper seal(s) transmit a frequency signal containing identification information to enable the inspection system to read and record the identification information in real time. The RFID tamper seal consists of an insulating main body 2, a rod portion 3, an antenna 4, a metal ring 5 and a circuit module 14. The following descriptions provide the details of each constituent component of the RFID tamper seal 1.

Again referring to FIG. 4, the main body 2 of the RFID tamper seal 1 is a casing body made of insulating material, wherein the insulating material may include—but is not limited to—Teflon or polyethylene electrical insulating material for protecting the inner components from being penetrated by moisture. One portion of the main body 2 has a helix-shaped antenna 4 accommodated therein and the remaining portion thereof has a ring-shaped metal ring 5 with a C-shaped ring 7 inlaid in the inner surface thereof, wherein the antenna 4 has an antenna detecting probe 6 extending and protruding from the metal ring 5. Furthermore, the antenna 4 may be a dipole antenna.

The rod portion 3 comprises a metal cylindrical body 11 having a hollow portion 13. Note that the metal cylindrical body 11 is a particular embodiment as opposed to a design limitation. A first portion 24 of the locking rod 3 is in a cone shape and is encapsulated by an insulating material 10, whereas a second portion 25 thereof not covered by the insulating material 10 has a ring-shaped groove 26 disposed around its outer peripheral surface.

Figure 5:
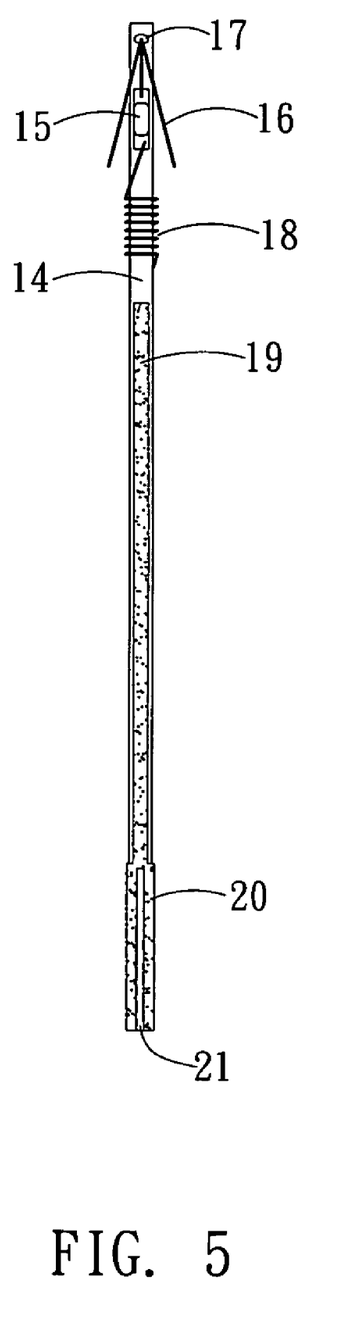
FIG. 5 is a cross-sectional view showing the circuit module of the RFID tamper seal in accordance with the present invention.

FIG. 5 is a cross-sectional view showing the circuit module 14 of the RFID tamper seal 1 in accordance with the present invention. The circuit module 14 has an RFID chip 15 embedded therein and is packaged into the hollow portion 13 of the rod portion 3. One end of the RFID chip 15 is electrically connected to a conductive elastic piece 16, while the other end thereof is connected to one end of the impedance module 18 installed on the circuit module 14, and the other end of the impedance module 18 is connected to the probe sheath 20 via the conductive material 19 coated on circuit module 14 (i.e. the circuit board). As shown in FIG. 5, the probe sheath 20 has an elongated space 21 for allowing the antenna probe 6 to be inserted therein. The conductive elastic piece 16 may be a metal elastic piece in a V-shape or any other shapes.

In assembly, the circuit module 14 may be packaged in the rod portion 3 in the fabrication process, and subsequent to the packaging, the second portion 25 of the rod portion 3 is inserted into the metal ring 5 of the insulating main body 2, allowing the ring-shaped groove 26 on the second portion 25 of the rod portion 3 to be coupled to the C-shaped ring 7 in the metal ring 5, and further allowing the antenna probe 6 extending from the helix-shaped antenna 4 to be inlaid in the rod portion 3, thereby establishing an electrical connection between the antenna 4 and the circuit module 14 and allowing an RFID reader to read the electromagnetic wave containing an ID code transmitted from the RFID chip 15 via the antenna 4. Further, the probe sheath 20 is covered by an insulating material 22 which may include a Teflon or polythene coating material for isolating the sheath 20 from the metal pillar 11 of the rod portion 3.

In this embodiment, after packaging the circuit module 14 into the rod portion 3, each of two ends of the V-shaped conductive elastic piece 16 is electrically connected to the metal pillar 11 of the rod portion 3, and the convergent point 17 of the two ends is connected to the RFID chip 15. The impedance module 18 is formed by winding a metal coil on the rod portion 3 or by using other suitable passive components, thereby allowing the impedance module 18 to form an electrical connection (via the RFID chip 15) with the V-shaped conductive elastic piece 16, and with the metal pillar 11 of the rod portion 3, so as to form a grounding antenna impedance. Similarly, the probe sheath 20 is connected with the antenna probe 6 disposed in the probe sheath 20 by a conductive material (copper coating), thereby forming a probe antenna impedance matching with the grounding antenna impedance.

The grounding antenna impedance (the V-shaped conductive elastic piece 16 plus the metal pillar 11 of the rod portion 3) and the probe antenna impedance (the impedance module 18, the conductive material and the antenna probe 6) match one another to enable the RFID chip 15 to sense and transmit by the antenna 4 electromagnetic waves between the antenna 4 and the RFID reader (not shown), wherein the impedance is adjusted by the probe antenna impedance via the impedance module 18 in order to match with the grounding antenna impedance.

Figure 6:
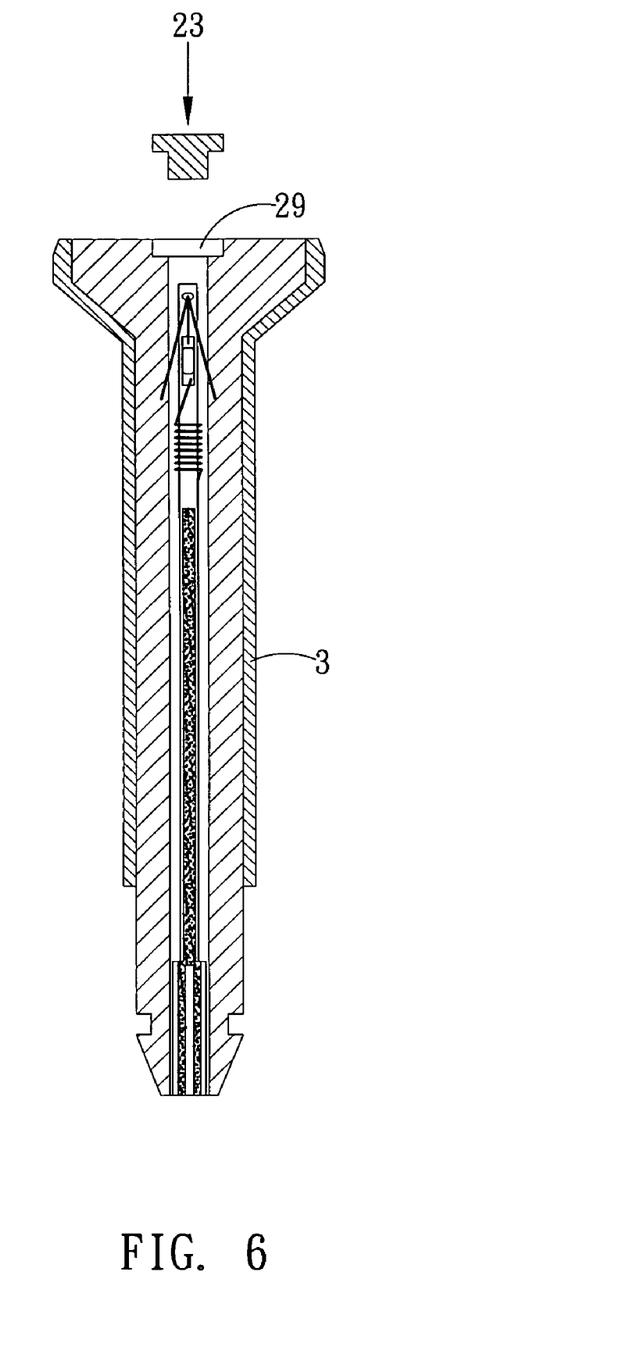
FIG. 6 is a cross-sectional view showing the second embodiment of the RFID tamper seal in accordance with the present invention.

FIG. 6 is an assembled cross-sectional view showing a second embodiment of the RFID tamper seal in accordance with the present invention. This embodiment differs from the first one only in that it comprises a metal cap 23, and thus, the detailed description of the other constituent components is omitted for brevity. Also, FIG. 6 illustrates only the rod portion 3 of the RFID tamper seal of the invention for brevity and in order to distinguish the difference. As shown, the rod portion 3 is preformed with an opening 29, wherein, upon assembly, the circuit module 14 is pushed into the opening 29 formed at the bottom of the rod portion 3. Then, the opening 29 is sealed by the metal cap 23.

Figure 7:
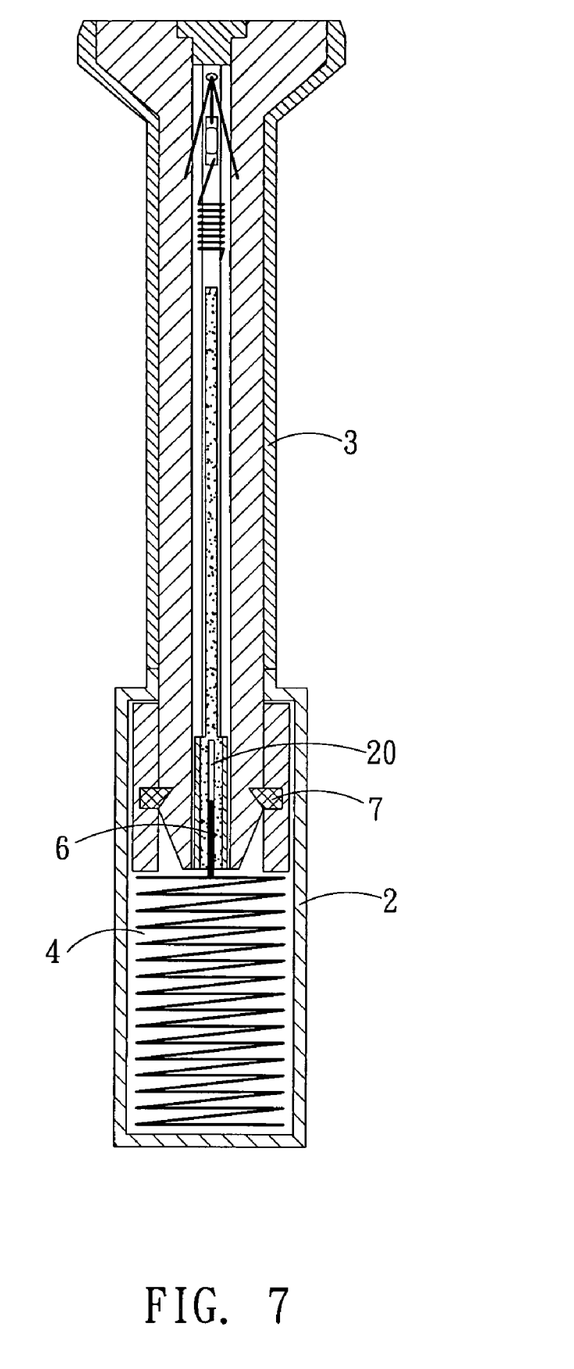
FIG. 7 is a cross-sectional view showing the assembled RFID tamper seal in accordance with the present invention.

FIG. 7 is a cross-sectional view showing the RFID tamper seal depicted in FIG. 6 after complete assembly. As shown, the rod portion 3, after insertion into the insulating main body 2, is tightly engaged with the C-shaped ring 7 of the insulating main body, and the antenna probe 6 extending from the antenna 4 is inserted into the probe sheath 20 and is in close contact with the probe sheath 20 to form an electrical connection therebetween.

Figure 8:
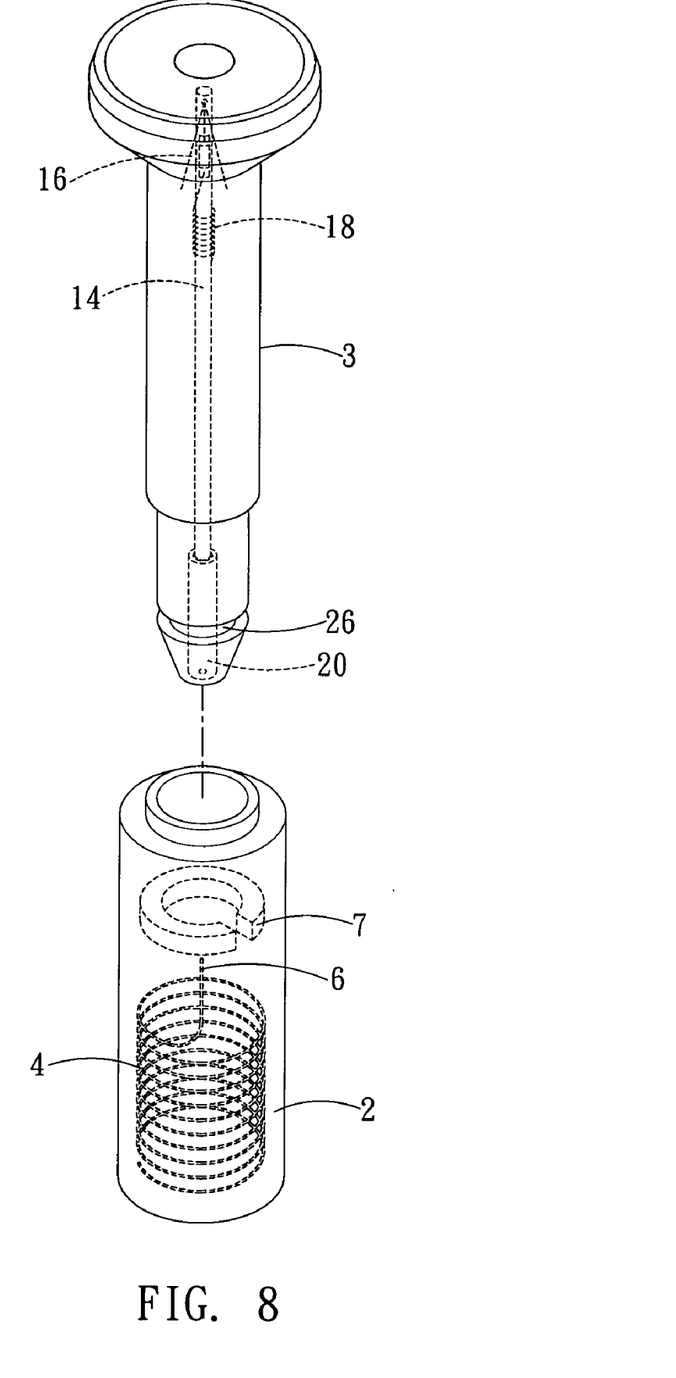
FIG. 8 is a perspective exploded view showing the RFID tamper seal in accordance with the present invention.

FIG. 8 is a perspective exploded view showing the RFID tamper seal of the present invention, from which the corresponding relationship between the constituent components of the insulating main body 2 and the rod portion 3 is illustrated. The RFID tamper seal consists of the two main components of the insulating main body 2 and the rod portion 3. The rod portion 3 further comprises the circuit module 14 inserted therein, wherein the circuit module is comprised of an RFID chip 16, an impedance module 18, a V-shaped conductive elastic piece 16 and a probe sheath 20. The antenna 4 installed in the main body 2 is helix-shaped, and the C-shaped ring 7 is disposed in the main body 2, wherein the antenna probe 6 extending from the helix-shaped antenna 4 protrudes in a direction towards the center of the C-shaped ring 7 corresponding to the center position of the probe sheath 20 contained in the rod portion 3, the C-shaped ring 7 corresponding to the ring-shaped groove 26 of the rod portion 3 to enable the rod portion 3 to tightly engage with the ring-shaped groove 26 when the rod portion 3 is inserted into the main body 2. Accordingly, the rod portion 3 is inserted into the main body 2 to be electrically connected for operation without any directional orientation concerns in the assembly of the constituent components of the main body 2 and the rod portion 3.

Figure 9:
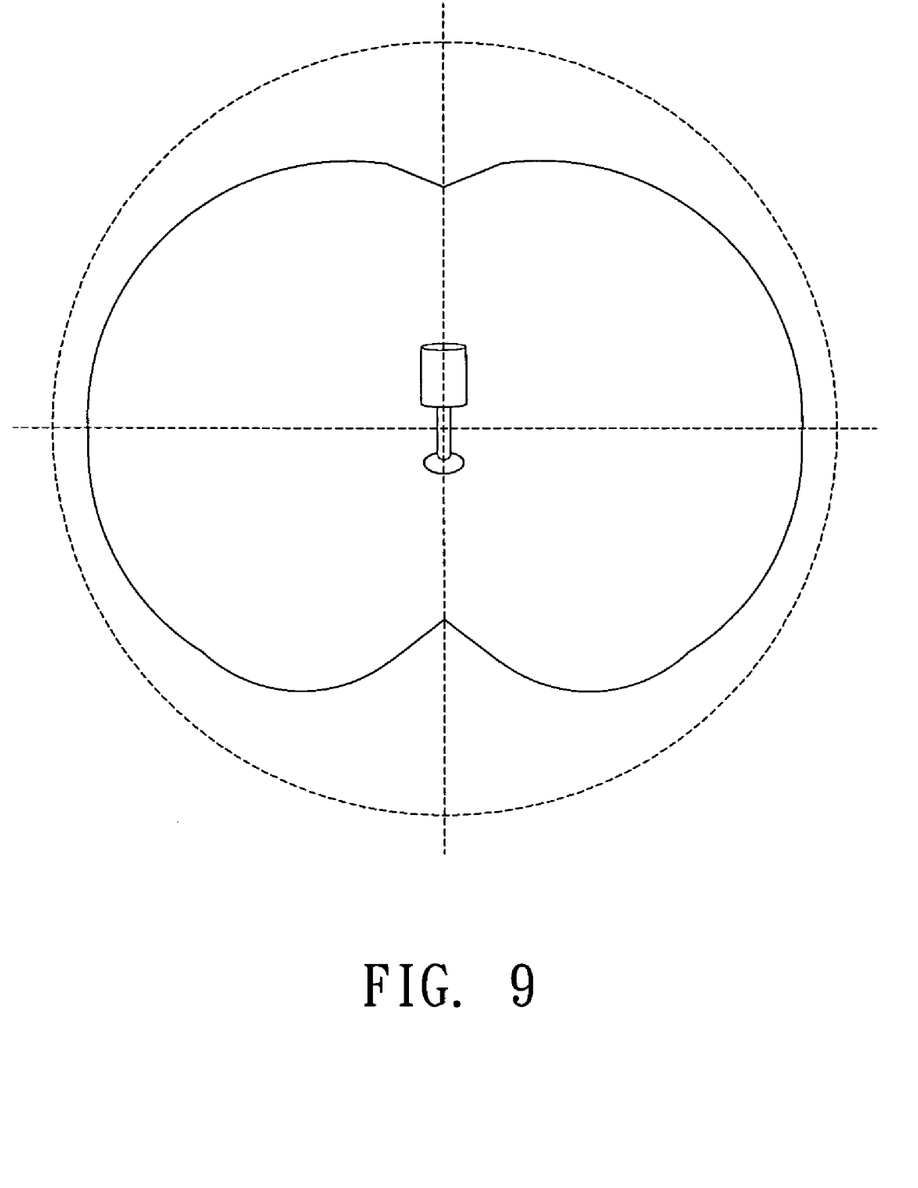
FIG. 9 is a side view showing the field pattern of the RFID tamper seal in accordance with the present invention.

FIG. 9 is a side view showing the field pattern of the RFID tamper seal in accordance with the present invention. As illustrated, the field pattern that the antenna 4 senses covers an area/range of two mostly overlapping circles; that is, the area of the field pattern is almost in a circular shape. In other words, the field pattern that can be sensed by the RFID tamper seal of the present invention is almost omnidirectional for allowing transmitted signals to be easily read from all directions, thus use of the invention doesn't require any fastening component or care in order to orientate the invention in order for the antenna to be sensed by the RFID reader as required in the prior art.

Figure 10:
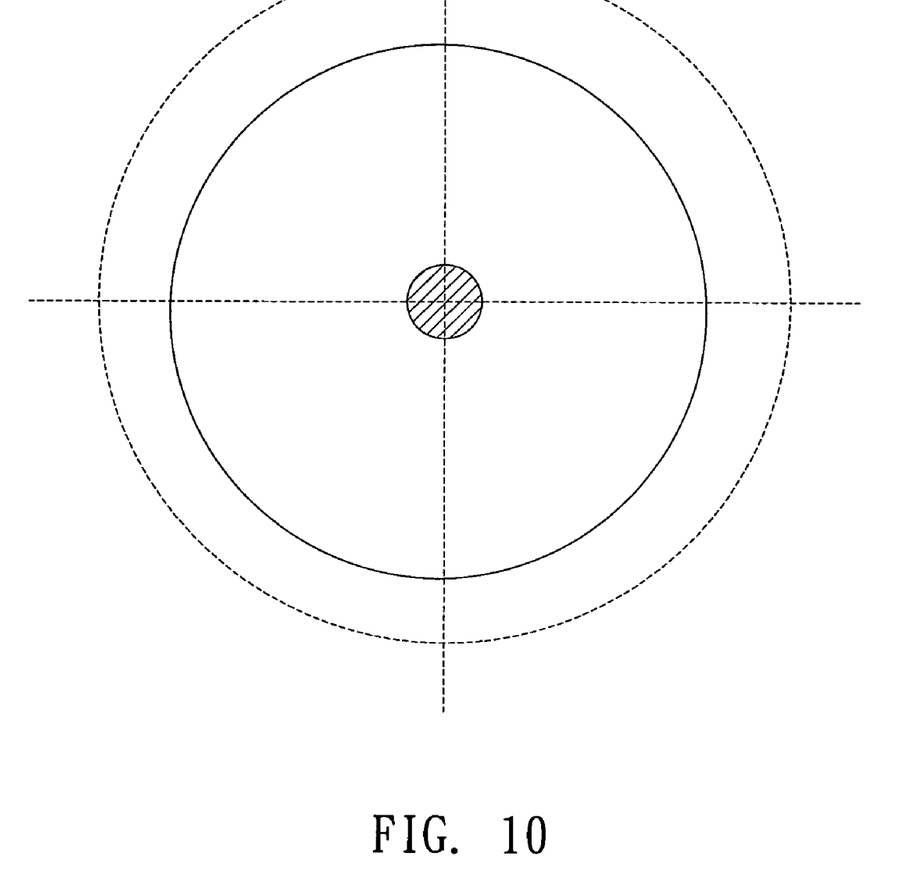
FIG. 10 is a top view showing the field pattern of the RFID tamper seal in accordance with the present invention.

FIG. 10 is a top view showing the field pattern of the RFID electronic tamper seal in accordance with the present invention. As mentioned above, the shape or range of the field pattern is almost circular such that the antenna device of the RFID electronic tamper seal can be freely disposed on the door bolt latches of a container without worrying about the orientation.

In conclusion, the RFID tamper seal proposed by the present invention is characterized by a helix-shaped antenna capable of omnidirectional transmission of frequency signals, which is applicable to and more compatible with various types of readers having differing orientations without concern about the orientation of the container lock bolt latch or the antenna. Accordingly, with easy installation, user-friendly operation, low maintenance and high security, the present invention improves on and yields advantages over prior techniques and has high applicability.

What is claimed is:

1. An RFID cargo/storage container tamper seal applicable to Customs safety cargo container inspection systems equipped with RFID readers, comprising:
   a main insulating body;
   a helix-shaped antenna installed in the main insulating body and comprising a probe;
   a metal ring accommodated in the main insulating body and having a C-shaped ring inlaid around its inner surface;
   a locking rod comprised of a hollow metal pillar, wherein a first portion of the locking rod is in a cone shape and is encapsulated by an insulating material and a second portion thereof uncovered by the insulating material has a ring-shaped groove disposed around its peripheral surfaces; and
   a circuit module comprised of an RFID chip, an impedance module, a conductive elastic piece and a probe sheath, the circuit module being packaged in the hollow portion of the locking rod, one end of the RFID chip being connected with the conductive elastic piece while the other end of the RFID chip is electrically connected to one end of the impedance module, and the other end of the impedance module being electrically connected to the probe sheath via the conductive material plated on the circuit module.

2. The RFID tamper seal as claimed in claim 1, wherein the conductive material coated on the circuit module is copper.

3. The RFID tamper seal as claimed in claim 1, wherein the second portion of the rod portion is disposed in the metal ring of the main body, and the ring-shaped groove formed on the second portion engages with the C-shaped ring disposed on the metal ring.

4. The RFID tamper seal as claimed in claim 1, wherein the antenna probe protrudes into the metal ring.

5. The RFID tamper seal as claimed in claim 1, wherein antenna probe is encapsulated by an insulating material.

6. The RFID tamper seal as claimed in claim 1, wherein the insulating material comprises Teflon or polyethylene.

7. The RFID tamper seal as claimed in claim 1, wherein the impedance module comprises metal wires of coils or an impedance matching device constituted by passive components.

8. The RFID tamper seal as claimed in claim 1, wherein the conductive elastic piece electrically connected to one end of the RFID chip comprises two ends that are both electrically connected to the metal pillar to form grounding antenna impedance, and the other end of the impedance module is connected with the probe sheath via a conductive material coated on the circuit module to form an electrical connection between the probe sheath and the antenna probe inserted into the probe sheath, thereby forming a matching probe antenna impedance with the grounding antenna impedance.

9. The RFID tamper seal as claimed in claim 1, further comprising a metal cap for covering one of the two ends of the rod portion.

10. The RFID tamper seal as claimed in claim 1, wherein the conductive elastic piece is constituted by conductive metals.

11. The RFID tamper seal as claimed in claim 10, wherein the conductive elastic piece is a V-shaped conductive elastic piece.

12. The RFID tamper seal as claimed in claim 11, wherein after the circuit module is packaged in the rod portion, two ends of the V-shaped conductive elastic piece each respectively connect with the rod portion, and the convergent point of two ends of the V-shaped conductive elastic piece is electrically connected to the RFID chip.

13. The RFID tamper seal as claimed in claim 11, wherein both ends of the V-shaped conductive elastic piece are connected with the rod portion to form grounding antenna impedance.

14. The RFID tamper seal as claimed in claim 1, wherein one end of the first portion of the metal pillar is a trumpet-shaped cone body.

15. The RFID tamper seal as claimed in claim 1, wherein the antenna is a dipole antenna.

* * * * *